(No Model.)
U. S. ARCHER.
NUT LOCK.
No. 590,294. Patented Sept. 21, 1897.
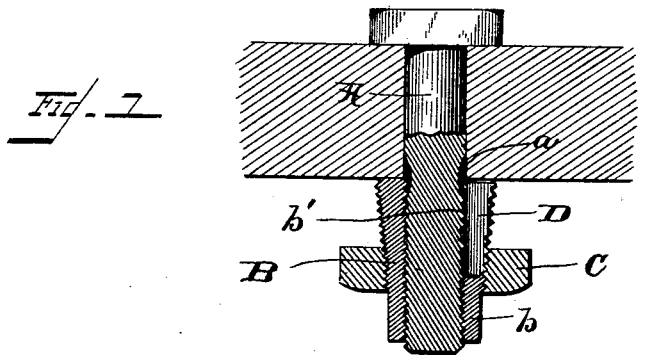
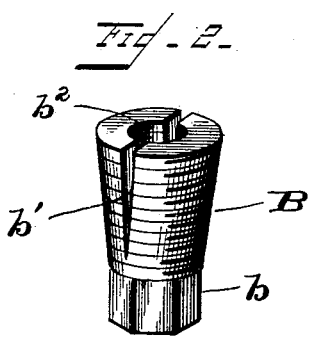
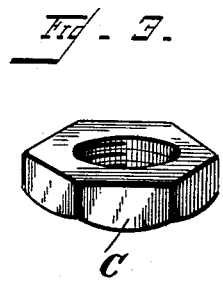
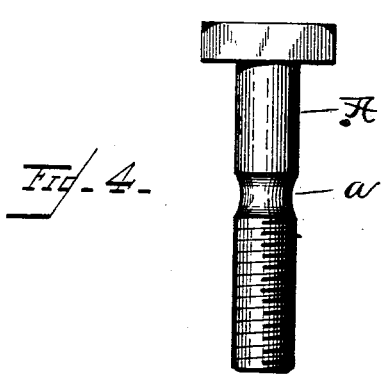
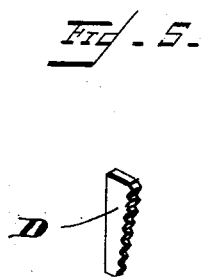
WITNESSES
Marcus L. Byng.
J. C. Tappan.
INVENTOR,
Ulysses S. Archer,
By John Wedderburn
Attorney

UNITED STATES PATENT OFFICE.

ULYSSES S. ARCHER, OF LENOIR CITY, TENNESSEE.

NUT-LOCK.

SPECIFICATION forming part of Letters Patent No. 590,294, dated September 21, 1897.

Application filed September 28, 1896. Serial No. 607,233. (No model.)

*To all whom it may concern:*

Be it known that I, ULYSSES S. ARCHER, a citizen of the United States, residing at Lenoir City, in the county of Loudon and State of Tennessee, have invented certain new and useful Improvements in Nut-Locks; and I do hereby declare the following to be a full, clear, and exact description of the invention, such as will enable others skilled in the art to which it appertains to make and use the same.

This invention consists of certain novel constructions, combinations and arrangements of parts, all of which will be hereinafter more fully described and claimed.

In the accompanying drawings, forming a part of this specification, Figure 1 represents a central vertical section through a nut-lock embodying my invention applied to a bolt. Fig. 2 represents a detail perspective view of the nut proper, and Fig. 3 represents a detail perspective view of the locking-nut. Fig. 4 represents a detail side elevation of the bolt. Fig. 5 represents a detail perspective view of the locking-key.

A in the drawings represents a suitable bolt upon which the nuts are to be applied, B the nut proper applied thereon, and C the locking-nut. The said nut B comprises an angular nut portion proper $b$, adapted to receive a suitable wrench for turning the nut into position, and an external screw-threaded split portion $b'$, adapted to receive the locking-nut C, which is provided with suitable screw-threads for this purpose. The split portion $b'$ of the nut B is slightly tapered in formation, so that as the said nut C is screwed onto the same the screw-threaded passage $b^2$ through the same is contracted and bound tightly about the bolt A. I make the threads upon the portion $b'$ run in an opposite direction from the threads within the passage $b^2$, so that they will act one against the other.

I provide the bolt A with an annular groove $a$, into which the split end of the nut B is adapted to be forced when the nut C is screwed over the same. This action of said nut B effectually locks it against any backward rotation upon the bolt A. I also provide a tapering locking-key D, having one of its sides cut to correspond with the threads of nut C. This key D is adapted to be applied between the split portions of the nut B and is of less width than the slot between said split portions.

It will be observed from the foregoing description that when the nut is to be applied upon the bolt the portion $b$ is first screwed into such a position that its inner split end projects over the groove in the bolt. The locking-key D is then inserted between the split portions. The locking-nut C is then screwed onto the portion $d'$ until it engages the inclined upper surface of the locking-key D. When in this latter position, the split portion of the said nut B is contracted and passed into the groove $a$, and at the same time the threads of the respective nuts have jammed, thus doubly locking the nut. At the same time the locking-key D is forced down into engagement with the threads of the bolt, thus providing an additional locking means.

When my improved locking-nut has been applied in position, it is next to impossible to accidentally loosen the same, as the natural tendency of the oppositely-inclined threads is to tighten when rotated.

Having thus described my invention, what I claim as new, and desire to secure by Letters Patent, is—

1. In a nut-lock, the combination with a nut proper having a screw-threaded split portion, of screw-threads formed upon the outer surface of said nut, and running in an opposite direction from the threads arranged upon the interior of said nut, and a locking-nut applied upon the outer ends of the split portion of the nut proper and adapted to jam the threads and also to contract the split portion of the nut upon the bolt, substantially as described.

2. In a nut-lock, the combination with a screw-threaded bolt having an annular groove cut therein, of a split nut applied over said bolt, and a locking-nut applied over said split nut for compressing the split portions into the annular groove upon the bolt, substantially as described.

3. In a nut-lock, the combination with a nut proper, having a tapered screw-threaded split portion, of a locking-nut applied over said nut proper, and a wedge adapted to be applied between the split portions of the nut proper, and be jammed against the bolt by the locking-nut, substantially as described.

In testimony whereof I have signed this specification in the presence of two subscribing witnesses.

ULYSSES S. ARCHER.

Witnesses:
JNO. W. BUSSELL,
I. B. HALL.